(12) United States Patent
Yoshizumi

(10) Patent No.: US 11,533,668 B2
(45) Date of Patent: Dec. 20, 2022

(54) MOBILE STATION AND CELL-SWITCHING CONTROL METHOD FOR THE SAME

(71) Applicant: DENSO CORPORATION, Kariya (JP)

(72) Inventor: Osamu Yoshizumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 17/169,235

(22) Filed: Feb. 5, 2021

(65) Prior Publication Data

US 2021/0185584 A1 Jun. 17, 2021

Related U.S. Application Data

(63) Continuation of application No. PCT/JP2019/029469, filed on Jul. 26, 2019.

(30) Foreign Application Priority Data

Aug. 7, 2018 (JP) .............................. JP2018-148810

(51) Int. Cl.
  *H04W 4/00* (2018.01)
  *H04W 36/32* (2009.01)
  *H04W 4/029* (2018.01)
  *H04W 36/24* (2009.01)

(52) U.S. Cl.
  CPC ........... *H04W 36/32* (2013.01); *H04W 4/029* (2018.02); *H04W 36/245* (2013.01)

(58) Field of Classification Search
  CPC ... H04W 36/32; H04W 4/029; H04W 36/245; H04W 36/36; H04W 4/44; G01C 21/26
  USPC ........................................... 370/331; 455/312
  See application file for complete search history.

(56) References Cited

U.S. PATENT DOCUMENTS

| 9,386,497 | B1 * | 7/2016 | Sitaram ........... H04W 36/00837 |
| 2011/0263260 | A1 | 10/2011 | Yavuz et al. |
| 2015/0215831 | A1 * | 7/2015 | Jung ................. H04W 36/0085 370/332 |

FOREIGN PATENT DOCUMENTS

| JP | 2014-204159 A | 10/2014 |
| JP | 2017-216645 A | 12/2017 |

* cited by examiner

*Primary Examiner* — Marcos Batista
(74) *Attorney, Agent, or Firm* — Maschoff Brennan

(57) ABSTRACT

In a mobile station which communicates with a base station corresponding to a serving cell that is a cell in which the mobile station is located, of a plurality of cells, an acquirer is configured to acquire a situation of movement of the mobile station. A changer is configured to change a criterion used to determine whether to switch a communication destination from a first base station corresponding to the serving cell to a second base station corresponding to an adjacent cell neighboring the serving cell, in response to the situation of movement of the mobile station acquired by the acquirer and a positional relationship between the serving cell and the adjacent cell.

15 Claims, 9 Drawing Sheets

MOBILE STATION AND CELL-SWITCHING CONTROL METHOD FOR THE SAME

CROSS-REFERENCE TO RELATED APPLICATION

This application is based on and claims the benefit of priority from Japanese Patent Application No. 2018-148810 filed Aug. 7, 2018, the entire disclosure of which is incorporated herein by reference.

BACKGROUND

Technical Field

This disclosure relates to a mobile station and a cell-switching control method for the mobile station.

Related Art

In cellular telecommunications, a switch between cells is made by comparing indicators, such as qualities or intensities, of radio waves received at a mobile station from a base station corresponding to a serving cell in which the mobile station resides and a base station corresponding to an adjacent cell that is adjacent to the serving cell. These indicators are hereinafter referred to as "radio environment values". In this comparison, a threshold is set to a radio environment value at the serving cell plus a hysteresis value so as to avoid frequent occurrence of ping-pong effects in the mobile station located at a fixed point. When a state where a radio environment value at the adjacent cell above the threshold has continued for a predetermined wait time or longer, the communication destination is switched from the base station corresponding to the serving cell to the base station corresponding to the adjacent cell.

DESCRIPTION OF SPECIFIC EMBODIMENTS

A known control method as disclosed in JP-A-2017-216645 is focusing on avoidance of such ping-pong effects. This control method includes adding a first offset quality value to a quality value of a specific signal received from a first base station transmitting the specific signal with the highest quality value to acquire a first quality corrected value, and detecting a second base station transmitting a specific signal with a quality value greater than the first quality corrected value. Where the second base station is a base station with which wireless communication was established immediately before establishment of wireless communication with the first base station, cell switching control is performed when a time duration of the quality value of the specific signal from the second cell being above the threshold exceeds a second duration given by a predefined time duration plus an offset time duration, such that a switch is made from wireless communication with the first base station to wireless communication with the second base station.

As a result of detailed research performed by the present inventors, an issue has been found with the technique as disclosed in JP-A-2017-216645. That is, increasing the offset quality value or the offset time duration may cause the mobile station to continue to reside in the serving cell despite being able to receive higher quality radio waves from the adjacent cell, than from the serving cell, which may lead to degradation of the communication quality.

In view of the above, it is desired to have a technique for enhancing the communication quality while avoiding the ping-pong effects during cell switching in cellular telecommunications.

An overview of embodiments of the present disclosure will now be described before describing the embodiments of the present disclosure in detail.

Figure 1:
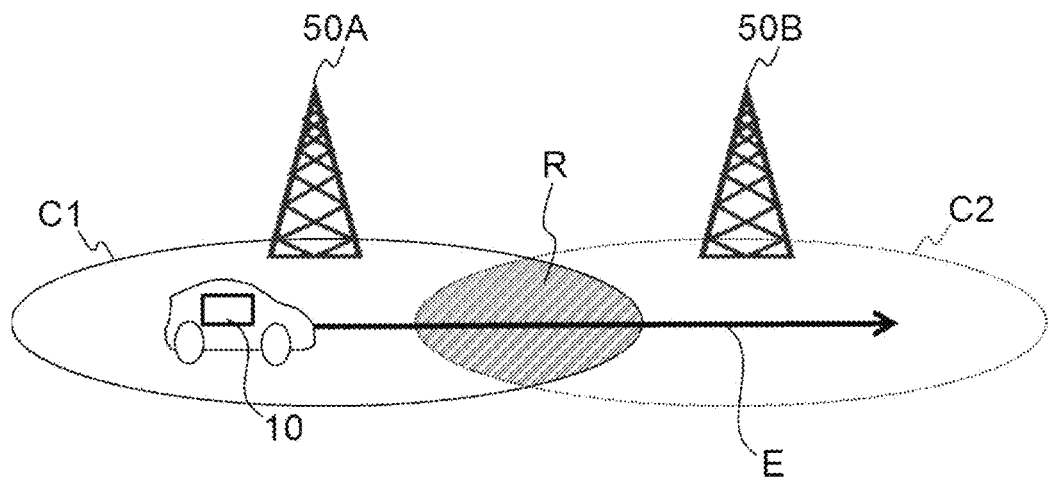
FIG. 1 is a schematic illustration according to each embodiment.

As illustrated in FIG. 1, a mobile station 10 is mounted to a vehicle and wirelessly communicates with base stations 50A, 50B. In an alternative embodiment, the mobile station 10 may be mounted to or carried by any other mobile object than the vehicle.

In the example of FIG. 1, a cell C1 is a region where radio waves can be received from the base station 50A and a cell C2 is a region where radio waves can be received from the base station 50B. A shaded region R is a region where radio waves can be received from both the base stations 50A and 50B. The cell C1 corresponds to a serving cell and the cell C2 corresponds to an adjacent cell. The base station 50A corresponds to a first base station and the base station 50B corresponds to a second base station.

In the region R, the mobile station 10 sets a threshold given by a radio environment value of a reference signal received from the base station 50A plus a hysteresis value. When a state where a radio environment value of a reference signal received from the base station 50B is above the threshold has continued for a predetermined wait time or longer, the mobile station 10 switches a communication destination from the base station 50A to the base station 50B. In the following, switching of the communication destination from the base station 50A to the base station 50B is also referred to as switching from the cell C1 to the cell C2.

In the present embodiment, a value called Reference Signal Received Quality (RSRQ) is used as the radio environment value. In another embodiment, a value called Reference Signal Received Power (RSRP) or another indicator may be used.

Figure 2:
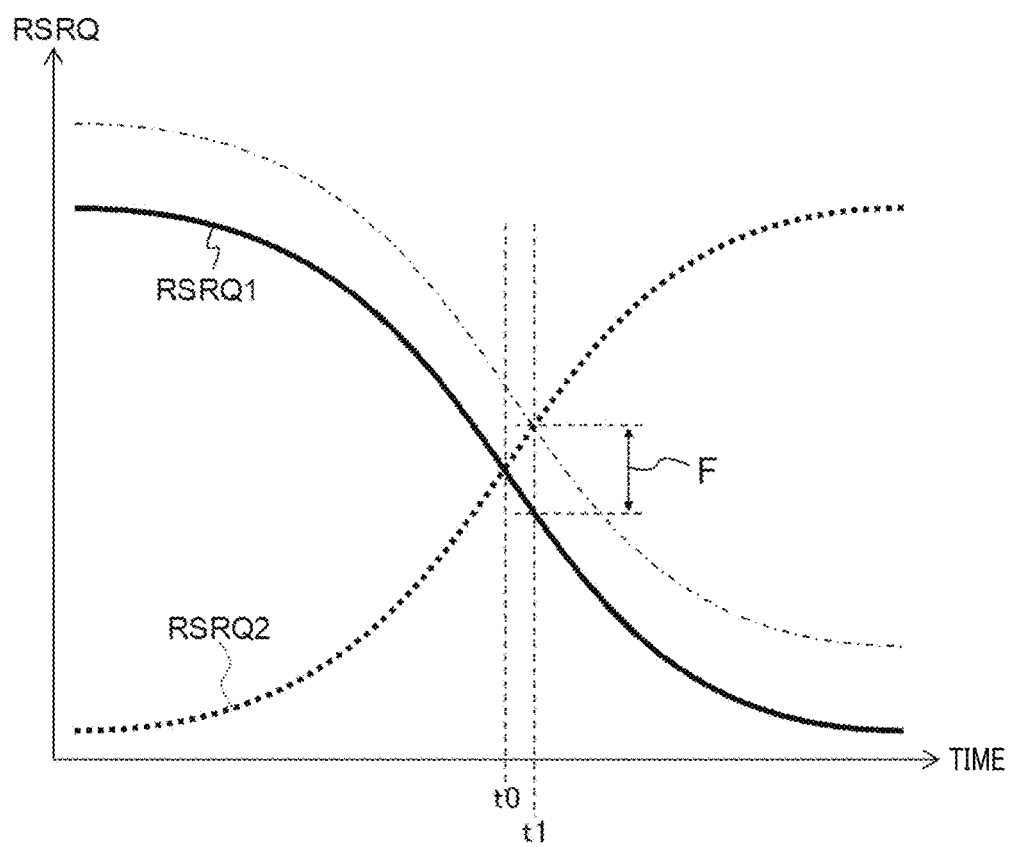
FIG. 2 is an illustration of cell switching.

FIG. 2 illustrates an example of the RSRQ acquired in the region R when the mobile station 10 is traveling from the cell C1 to the cell C2 in a direction of the arrow E as illustrated in FIG. 1. In FIG. 2, the solid line indicates the RSRQ of the base station 50A, the dotted line indicates the RSRQ of the base station 50B and the dashed-dotted line indicates the threshold. In the following, the RSRQ of the base station 50A is denoted by "RSRQ1" and the RSRQ of the base station 50B is denoted by "RSRQ2".

In this example, the RSRQ2 exceeds the threshold at time t1. Therefore, despite the RSRQ2 being above the RSRQ1, that is, RSRQ2>RSRQ1, the mobile station 10 will stay within the cell C1 during the time from t0 to t1.

Reducing the hysteresis value to be added to the RSRQ1, indicated by F in in FIG. 2, advances beginning of activation at t1, which can advance switching to a higher quality cell. However, the ping-pong effects become more likely to occur with the hysteresis value too much reduced.

In the embodiments below, cell-switching is controlled by changing a cell-switching criterion in response to a situation of movement of the mobile station 10 so as to increase a visit duration in which the mobile station 10 is located in a higher quality cell while avoiding the ping-pong effects, thereby enhancing the communication quality.

Hereinafter, some embodiments of the disclosure will be described with reference to the drawings. In order to facilitate understanding of the description, the same structural elements in the drawings share the same reference signs wherever possible, and overlapping description is omitted.

First Embodiment

Figure 3:
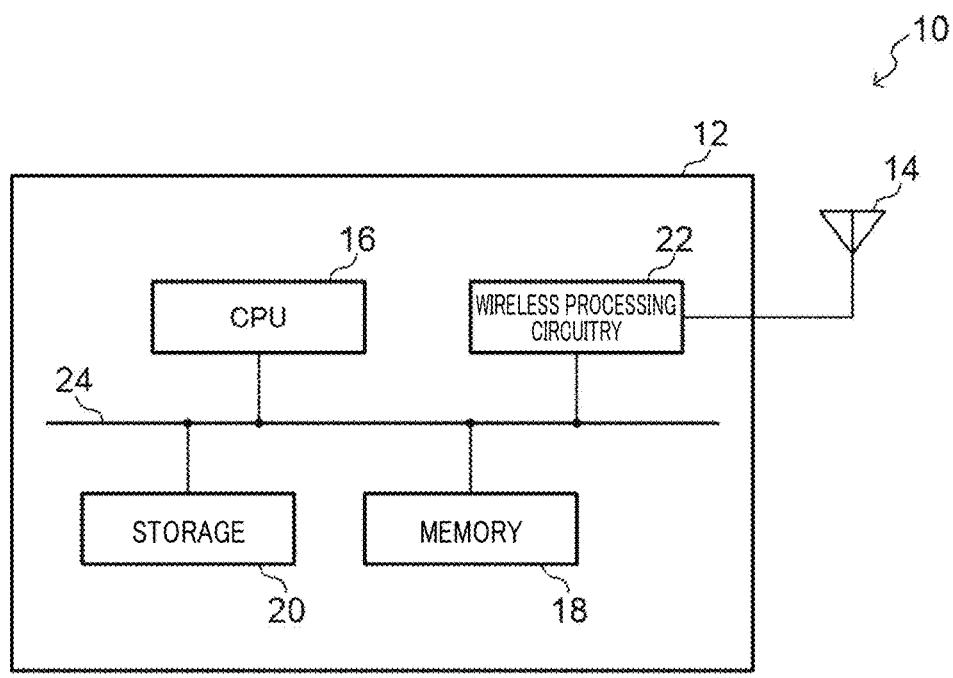
FIG. 3 is a block diagram of a hardware configuration of a mobile station according to each embodiment.

A hardware configuration of a mobile station 10 according to a first embodiment will now be described with reference to FIG. 3. As illustrated in FIG. 3, the mobile station 10 includes a controller 12 and an antenna 14. The controller 12 includes a central processing unit (CPU) 16, a memory 18 as a temporary memory area, a non-volatile storage 20, and wireless processing circuitry 22. The CPU 16, the memory 18, the storage 20, and the wireless processing circuitry 22 are communicably connected to each other via a bus 24.

The storage 20 stores a cell-switching control program for implementing a cell-switching control process including a setting process and a switching process described later. The CPU 16 performs various programs to control various components. That is, the CPU 16 loads the programs from the storage 20 and executes the programs using the memory 18 as a work area. The memory 18 includes a random-access memory (RAM), and temporarily stores programs and data as a work area. The storage 20 includes a read-only memory (ROM) and a hard disk drive (HDD) or a solid-state drive (SSD) to store various programs including an operating system and various data.

The wireless processing circuitry 22 is configured to process signals transmitted and received via the antenna 14. More specifically, the wireless processing circuitry 22 includes a circuit for performing frequency conversion between signals at radio frequency (RF) band frequencies and baseband signals, a circuit for performing analog-to-digital (AD) conversion, and a circuit for performing digital-to-analog (DA) conversion.

Figure 4:
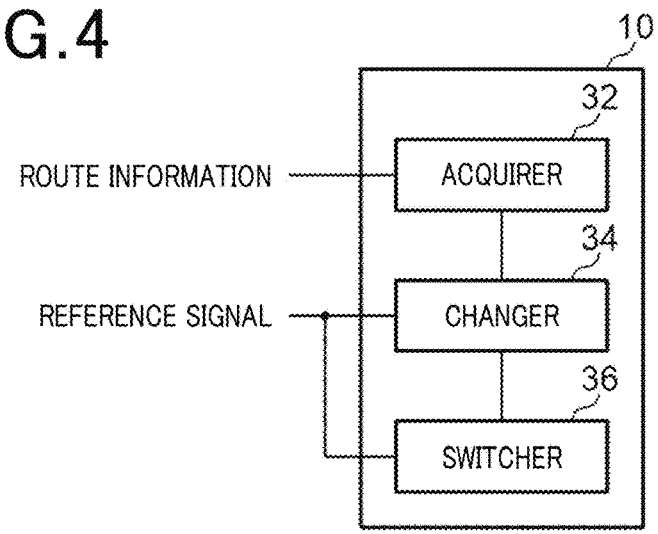
FIG. 4 is a functional block diagram of the mobile station according to a first embodiment.

Functions of the mobile station 10 will now be described with reference to FIG. 4. As illustrated in FIG. 4, the mobile station 10 includes an acquirer 32, a changer 34, and a switcher 36. Each of the acquirer 32 and the changer 34 may be implemented by the CPU 16 illustrated in FIG. 3 and the switcher 36 may be implemented by the CPU 16 and the wireless processing circuitry 22.

The acquirer 32 is configured to acquire, as a situation of movement of a mobile station, route information indicating a travel plan of a vehicle equipped with the mobile station. For example, the acquirer 32 acquires route information set by a car navigation system or the like.

The changer 34 is configured to change a criterion for switching the communication destination from the base station 50A to the base station 50B, in response to the route information acquired by the acquirer 32 and a positional relationship with the cell C1 and the cell C2. In the first embodiment, the changer 34 changes the criterion by changing a hysteresis value to be added to the RSRQ1.

More specifically, upon capturing the cell C2 while stay within the cell C1, that is, upon receipt of a reference signal from the base station 50b while stay within the cell C1, the changer 34 matches the route information acquired by the acquirer 32 and an area map indicating, for each base station, the extent of a cell in which the mobile station can connect to the base station. The changer 34 determines whether the mobile station will move out of the cell C1 and intrude into the cell C2 or stay within the cell C1.

When determining that the mobile station will move out of the cell C1 and intrude into the cell C2 as indicated by the arrow E in FIG. 1, the changer 34 changes the hysteresis value so as to make the communication destination easier to switch from the base station 50A to the base station 50B. For example, the changer 34 decreases the threshold by subtracting a constant $\alpha$ from the hysteresis value hyst or by multiplying the hysteresis value hyst by a constant $\alpha$ less than one.

Figure 5:
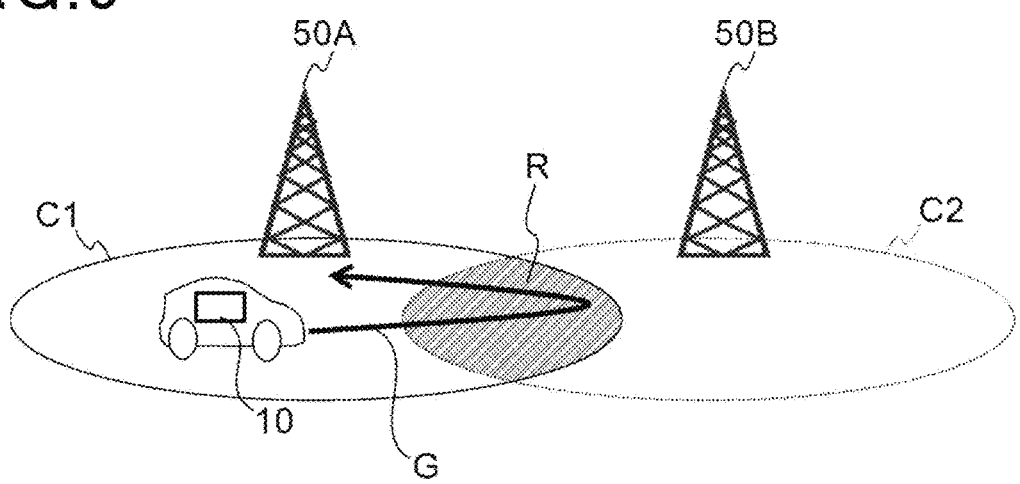
FIG. 5 is an illustration of a situation where the mobile station will stay in a serving cell.

When determining that the mobile station will stay within the cell C1 indicated by the arrow G in FIG. 5, the changer 34 changes the hysteresis value so as to make the communication destination harder to switch from the base station 50A to the base station 50B. For example, the changer 34 increases the threshold by adding a constant $\beta$ to the hysteresis value hyst or by multiplying the hysteresis value hyst by a constant $\beta$ greater than one.

In subtracting the constant $\alpha$ from the hysteresis value hyst, the value of hyst–$\alpha$ may be limited to 0 or greater. In an alternative embodiment, taking into account a processing time from determination to perform cell-switching to completion of cell-switching, the value of hyst–$\alpha$ may be a negative value. For example, in a case where the processing time is one second and the RSRQs change with time as illustrated in FIG. 2, $\alpha$ may be used such that the value of hyst–$\alpha$ becomes a negative value, taking into account RSRQ1 becoming equal to or less than RSRQ2 after one second.

While stay within the cell C1 with the cell C2 being captured, that is, while stay within the region R, the switcher 36 calculates the RSRQ1 and the RSRQ2 from the reference signals received from the base stations 50A, 50B. The switcher 36 controls cell-switching using the calculated RSRQ1 and RSRQ2, the hysteresis value hyst changed by the changer 34, and a predetermined wait time T. More specifically, the switcher 36 makes a switch from the cell C1 to the cell C2 in response to a state where the RSRQ2 is above RSRQ1+hyst having continued for the wait time T or longer.

After completion of cell-switching, the switcher 36 returns the hysteresis value hyst to a standard value, that is, a hysteresis value before it was changed by the changer 34.

Figure 6:
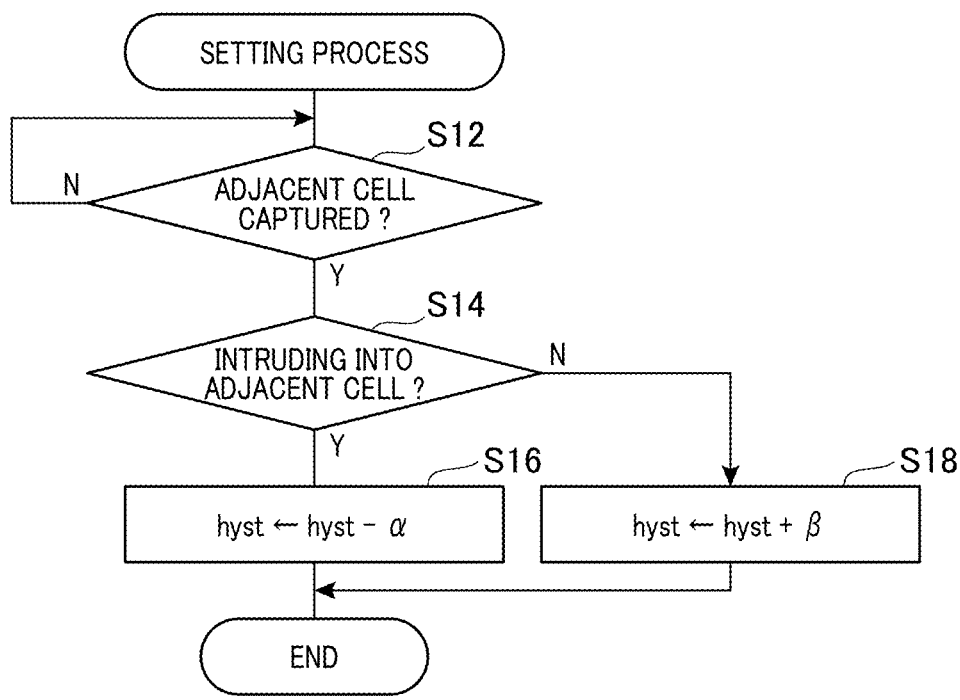
FIG. 6 is a flowchart of a setting process according to the first embodiment.
Figure 7:
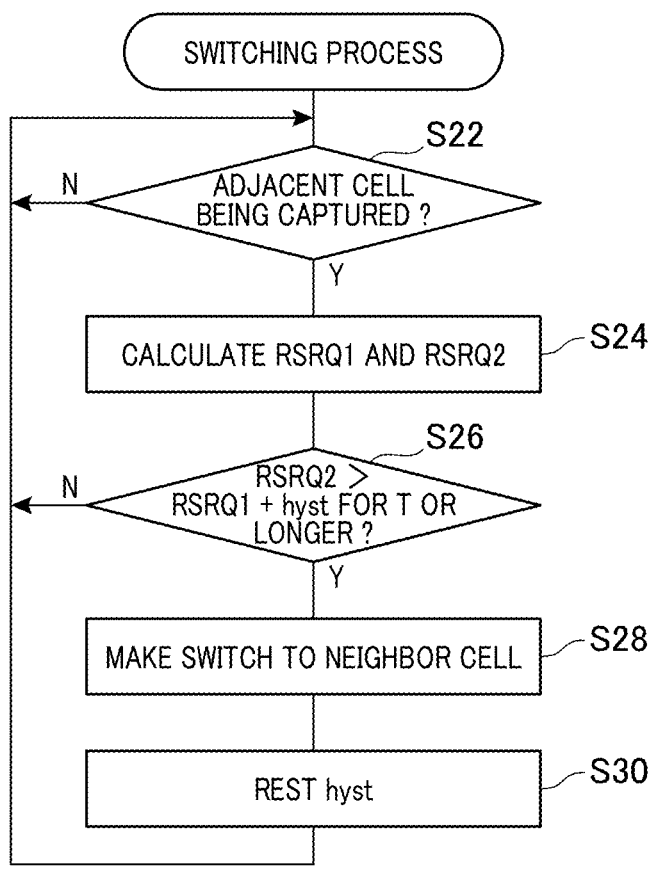
FIG. 7 is a flowchart of a switching process according to the first embodiment.

Operations of the mobile station 10 of the first embodiment will now be described. During activation of of the mobile station 10, the setting process illustrated in FIG. 6 is repeatedly performed. Upon the mobile station 10 capturing the adjacent cell C2, the switching process illustrated in FIG. 7 is performed.

The setting process will be described below with reference to FIG. 6.

At step S12, the changer 34 determines whether the mobile station 10 has captured the cell C2 that is an adjacent cell while stay in the serving cell C1, based on whether a reference signal has been received from the base station 50B. If the mobile station 10 has captured the adjacent cell C2 while stay in the serving cell C1, the process flow proceeds to step S14. Otherwise, the determination step S12 is repeated.

At step S14, the acquirer 32 acquires route information indicating a travel plan of the vehicle equipped with the mobile station from, for example, information set by the car navigation system or the like. The changer 34 matches the route information acquired by the acquirer 32 and the area map, and determines whether the mobile station will move out of the cell C1 and intrude into the cell C2, that is, whether the mobile station will intrude into the adjacent cell or stay in the serving cell. If the mobile station will intrude into the adjacent cell, the process flow proceeds to step S16. If the mobile station will stay in the serving cell, the process flow proceeds to step S18.

At step S16, the changer 34 changes the hysteresis value hyst to the standard value minus the constant α, and then the process flow ends. At step S18, the changer 34 changes the hysteresis value hyst to the standard hysteresis value hyst plus the constant β, and then the process flow ends.

The switching process will be described below with reference to FIG. 7.

At step S22, the switcher 36 determines whether the adjacent cell is being captured, based on whether the reference signal has been received from the base station 50B of the adjacent cell. If the adjacent cell is being captured, the process flow proceeds to step S24. Otherwise, the determination step S22 is repeated.

At step S24, the switcher 36 calculates RSRQ1 and RSRQ2 from the reference signals received from the base stations 50A, 50B.

Subsequently, at step S26, the switcher 36 acquires the calculated RSRQ1 and RSRQ2, the hysteresis value hyst as changed by changer 34 at step S16 or S18 in the setting process, and the predetermined wait time T. The switcher 36 determines whether a state where the RSRQ2 is above RSRQ1+hyst has continued for the wait time T or longer. If the state where the RSRQ2 is above RSRQ1+hyst has continued for the wait time T or longer, the process flow proceeds to step S28. Otherwise, the process flow returns to step S22.

At step S28, the switcher 36 switches the communication destination from the cell C1 to the cell C2 that is an adjacent cell. Thereafter, at step S30, the switcher 36 changes the hysteresis value hyst back to the standard value that is a hysteresis value before it was changed by the changer 34. The process flow returns to step S22.

Thus, the cell C2 becomes a new serving cell. Thereafter, the setting process illustrated in FIG. 6 and the switching process illustrated in FIG. 7 will be repeatedly performed.

As described above, the mobile station of the first embodiment determines whether the mobile station will intrude into the adjacent cell or stay in the serving cell, based on the route information of the mobile station. If the mobile station will intrude into the adjacent cell, the mobile station changes the hysteresis value so as to make the communication destination easier to switch from the serving base station to the adjacent base station. Though the threshold for determining to perform cell-switching is decreased when the mobile station intrudes into the adjacent cell, the ping-pong effects are harder to occur than when the mobile station stays at a fixed point in the overlapping region of the serving cell and the adjacent cell. Therefore, the mobile station of the first embodiment enables an earlier switch to an adjacent cell having a higher communication quality than the serving cell while avoiding the ping-pong effects, which can enhance the communication quality.

Modifications to the first embodiment will now be explained, where only differences from the first embodiment will be described. The same elements and steps as in the first embodiment are assigned the same numbers and will not be described again, for brevity.

As above, in the first embodiment, the criterion is changed by changing the hysteresis value to be added to the RSRQ. In a modification to the first embodiment, the criterion is changed by changing the wait time T. The mobile station 10 performs a setting process illustrated in FIG. 8 instead of the setting process illustrated in FIG. 6.

Figure 8:
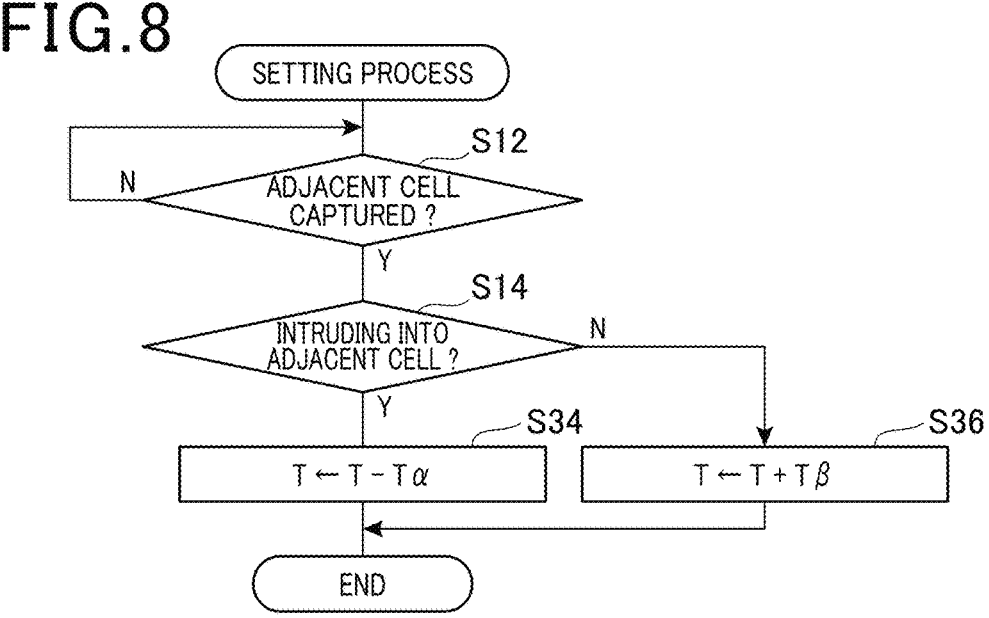
FIG. 8 is a flowchart of a setting process according to a modification to the first embodiment.

If, at step S14 of FIG. 8, it is determined that the mobile station will intrude into the adjacent cell, the process flow proceeds to step S34. At step S34, the changer 34 changes the wait time T to a standard wait time T minus a constant Tα. Thereafter, the process flow ends. If, at step S14, it is determined that the mobile station will stay in the serving cell, the process flow proceeds to step S36. At step S36, the changer 34 changes the wait time T to the standard wait time T plus a constant Tβ. Thereafter, the process flow ends.

In this switching process illustrated in FIG. 7, the changer 34 may change the wait time T back to the standard wait time T at step S30.

In another modification, the criterion is changed by changing the RSRQ2 of the adjacent cell. The mobile station 10 performs the setting process illustrated in FIG. 9 instead of the setting process illustrated in FIG. 6.

Figure 9:
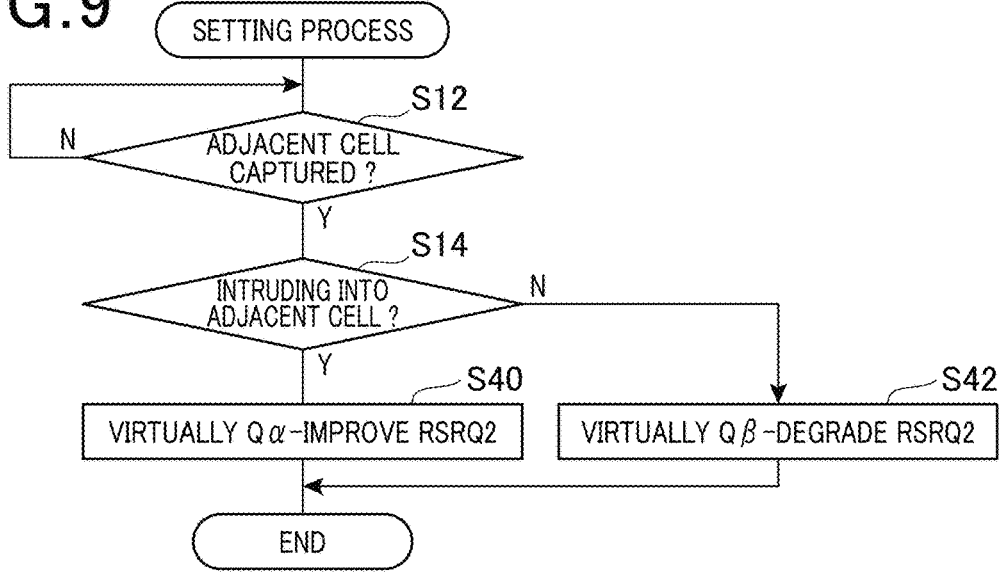
FIG. 9 is a flowchart of a setting process according to another modification to the first embodiment.

If, at step S14 of FIG. 9, it is determined that the mobile station will intrude into the adjacent cell, the process flow proceeds to step S40. At step S40, the changer 34 virtually sets the RSRQ2 to be Qα improved than the RSRQ2 calculated from the actual received reference signal. Improvement of the RSRQ2 may be implemented by adding a constant Qα to the actual RSRQ2 or by multiplying the actual RSRQ2 by a constant Qα greater than one (i.e., Qα>1). If, at step S14, it is determined that the subject mobile station will stay in the serving cell, the process flow proceeds to step S42. At step S42, the changer 34 virtually sets the RSRQ2 to be Qα degraded than the RSRQ2 calculated from the actual received reference signal. Degradation of the RSRQ2 may be implemented by subtracting a constant Qβ from the actual RSRQ2 or by multiplying the actual RSRQ2 by a constant Qβ (i.e., Qβ<1).

Instead, the RSRQ1 of the serving cell may be changed. More specifically, at step S40, the RSRQ1 may be degraded, and at step S42, the RSRQ1 may be improved. In this modification, the changed RSRQ1 may be used in cell-switching only, so as to not affect other processes using the RSRQ1, such as displaying icons indicating the radio wave quality.

The criterion may be changed by appropriately combining at least two of the hysteresis value hyst, the wait time T, the RSRQ1, and the RSRQ2.

Second Embodiment

A second embodiment will now be described, where only differences from the first embodiment will be described. The same elements and steps as in the first embodiment are assigned the same reference numbers and will not be described again for brevity. Hardware configurations of the second embodiment and subsequent embodiments are the same as that of the mobile base station 10 in the first embodiment as illustrated in FIG. 3.

Figure 10:
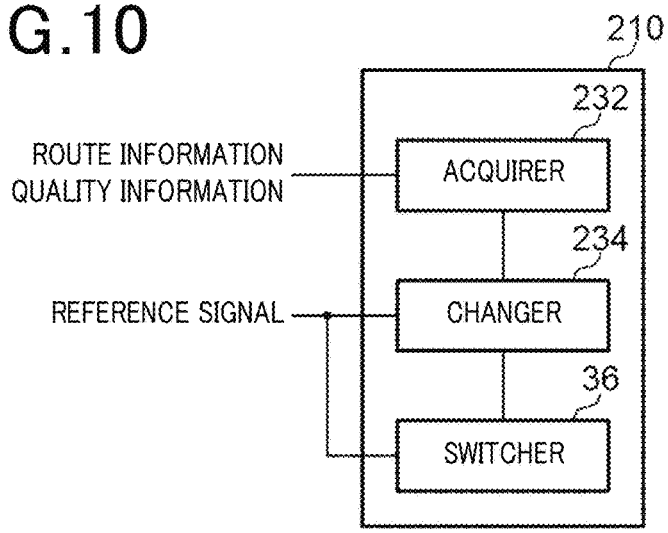
FIG. 10 is a functional block diagram of the mobile station according to a second embodiment.

Functions of the mobile station 210 will now be described with reference to FIG. 10. As illustrated in FIG. 10, the mobile station 210 includes an acquirer 232, a changer 234, and the switcher 36. Each of the acquirer 232 and the changer 234 may be implemented by the CPU 16 illustrated in FIG. 3. As used herein the term "subject mobile station" is refers to the mobile station including the acquirer 232, the changer 234, and the switcher 36.

Figure 11:
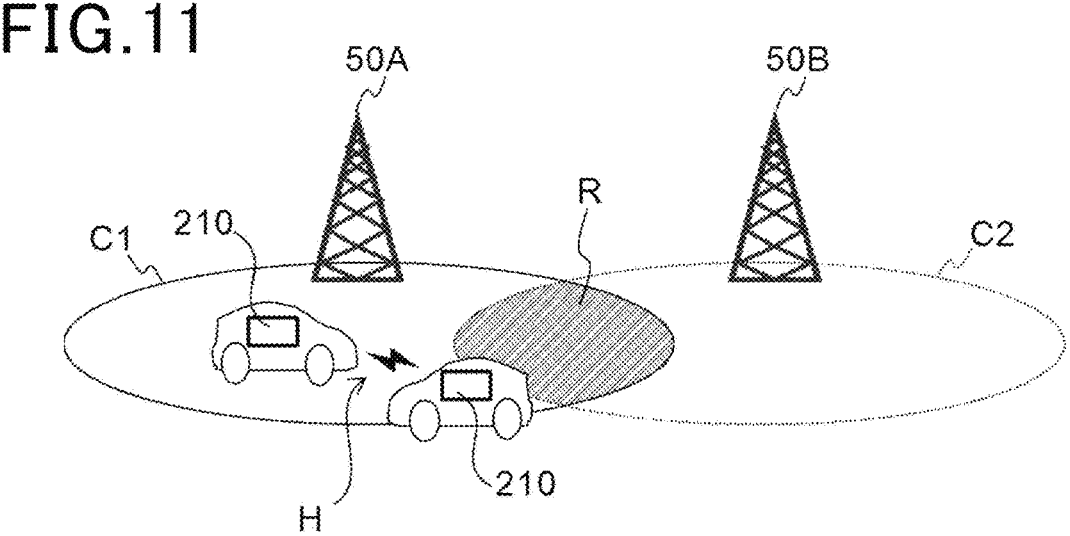
FIG. 11 is an illustration of a process of acquiring quality information via vehicle-to-vehicle communications.

Similarly to the acquirer 32 of the first embodiment, the acquirer 232 acquires route information of the subject mobile station. The acquirer 232 further acquires quality information indicating communication qualities of neighbor cells including the adjacent cell. For example, the acquirer 232 acquires quality information from another mobile station 210 via vehicle-to-vehicle communications as indicated by H in FIG. 11. For example, the acquirer 232 performs vehicle-to-vehicle communication according to a communication scheme of a short-range communication system in compliance with a communication standard, such as IEEE802.11p or the like. FIG. 11 illustrates an example situation where the subject mobile station 210 located in the cell C1 acquires quality information related to the cell C2 from a mobile station 210 that has come from the cell C2.

The quality information includes, for example, cell identification information for identifying which cell the quality information is related to, and the RSRQ calculated from the reference signal received in the identified cell. The quality information may include any other information related to the communication quality, such as the number of mobile stations 210 connected to the base station corresponding to the identified cell or information about the radio environment value other than RSRQ.

Similarly to the changer 34 of the first embodiment, the changer 234 changes the criterion for cell switching based on the route information. Regarding the adjacent cell that the subject mobile station will intrude into, the changer 234 further changes the criterion such that the higher the communication quality indicated by the quality information acquired by the acquirer 232, the easier the communication destination is switched from the base station 50A to the base station 50B. In addition, the changer 234 further changes the criterion such that the lower the communication quality indicated by the quality information acquired by the acquirer 232, the harder the communication destination is switched from the base station 50A to the base station 50B. As in the first embodiment, the criterion is changed by changing the hysteresis value to be added to the RSRQ1.

More specifically, if determining that the subject mobile station will intrude into the adjacent cell, the changer 234 references the quality information of the adjacent cell acquired by the acquirer 232. If the quality information meets a condition that indicates the high communication quality, the changer 234 changes the hysteresis value so as to make the communication destination even easier to switch from the base station 50A to the base station 50B. If the quality information does not meet the condition that indicates the high communication quality, the changer 234 changes the hysteresis value so as to make the communication destination even harder to switch from the base station 50A to the base station 50B.

The condition indicating the high communication quality may be predefined and include, for example, a condition that a value of RSRQ is equal to or greater than a predetermined value or a condition that the number of connections is equal to or less than a predetermined number. In cases where the acquirer 232 has acquired a plurality of pieces of quality information related to the adjacent cell, the most recently acquired quality information or an average of the plurality of pieces of quality information may be used to determine whether the communication quality of the adjacent cell is high.

Figure 12:
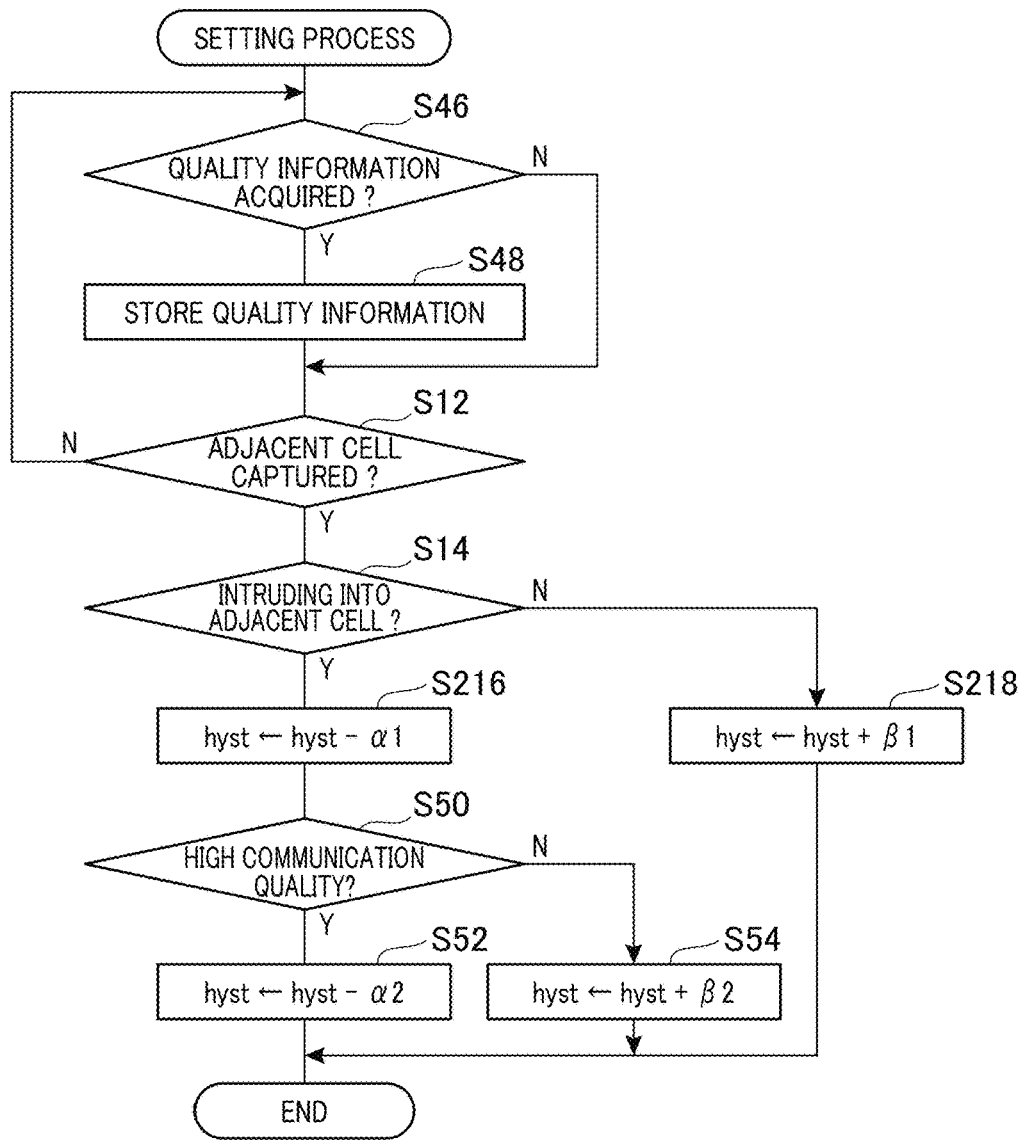
FIG. 12 is a flowchart of a setting process according to the second embodiment.

Operations of the mobile station 210 of the second embodiment will now be described. During activation of the mobile station 210, the setting process illustrated in FIG. 12 is repeatedly performed. Upon the mobile station 210 capturing the adjacent cell C2, the switching process illustrated in FIG. 7 is performed. Since the switching process of each of the second and subsequent embodiments is similar to that of the first embodiment, only the setting process will be described below regarding the operations of the mobile station in each of the second and subsequent embodiments.

At step S46 in FIG. 12, the changer 234 determines whether the acquirer 232 has acquired quality information related to another cell from another mobile station 210 via vehicle-to-vehicle communications. If the acquirer 232 has acquired quality information related to another cell from another mobile station 210, the process flow proceeds to step S48. At step S48, the changer 234 stores the quality information acquired by the acquirer 232 in a predefined storage area. Then, the process flow proceeds to step S12. If the acquirer 232 has not acquired quality information related to another cell from another mobile station 210, the process flow proceeds directly to step S12.

If, at step S12, the changer 234 determines that the adjacent cell has not been captured, the process flow return to step S46. If the changer 234 determines that the adjacent cell has been captured, the process flow proceeds to step S14. At step S14, the changer 234 determines whether the subject mobile station will intrude into the adjacent cell or stay in the serving cell. If the subject mobile station will intrude into the adjacent cell, the process flow proceeds to step S216. If the subject mobile station will stay in the serving cell, the process flow proceeds to step S218.

At step S216, the changer 234 changes the hysteresis value hyst to a standard hysteresis value hyst minus a constant α1. Then the process flow proceeds to step S50. At step S218, the changer 234 changes the hysteresis value hyst to the standard hysteresis value hyst plus a constant β1. Thereafter, the process flow ends.

At step S50, the changer 234 references, from the quality information stored in the predefined storage area, the quality information related to the adjacent cell that the subject mobile station will intrude into, and determines whether this quality information meets a condition that indicates the high communication quality. If the communication quality is high, the process flow proceeds to step S52. If the communication quality is low, the process flow proceeds to step S54.

At step S52, the changer 234 further changes the hysteresis value hyst to the hysteresis value hyst calculated at step S216 (i.e., the standard hysteresis value hyst minus the constant α1) minus a constant α2. Then, the process flow ends. At step S54, the changer 234 further changes the hysteresis value hyst to the hysteresis value hyst calculated at step S218 (i.e., the standard hysteresis value hyst plus the constant β1) plus a constant β2. Then the process flow ends.

If the quality information related to the adjacent cell that the subject mobile station will intrude into is not stored in the predefined storage area, steps S50 to S54 will be skipped.

As described above, the mobile station of the second embodiment shares the advantages of the mobile station of the first embodiment. In addition, if the communication quality of the adjacent cell that the subject mobile station will intrude into is high, the mobile station of the second embodiment changes, based on quality information of other cells acquired via vehicle-to-vehicle communications, the criterion so as to make the communication destination easier to switch from the serving cell to the adjacent cell. This enables an earlier switch to a cell of higher communication quality, which can enhance the communication quality.

Modifications to the second embodiment will now be explained. The same elements and steps as in the second embodiment are assigned the same reference numbers and thus will not be described again in detail.

Figure 13:
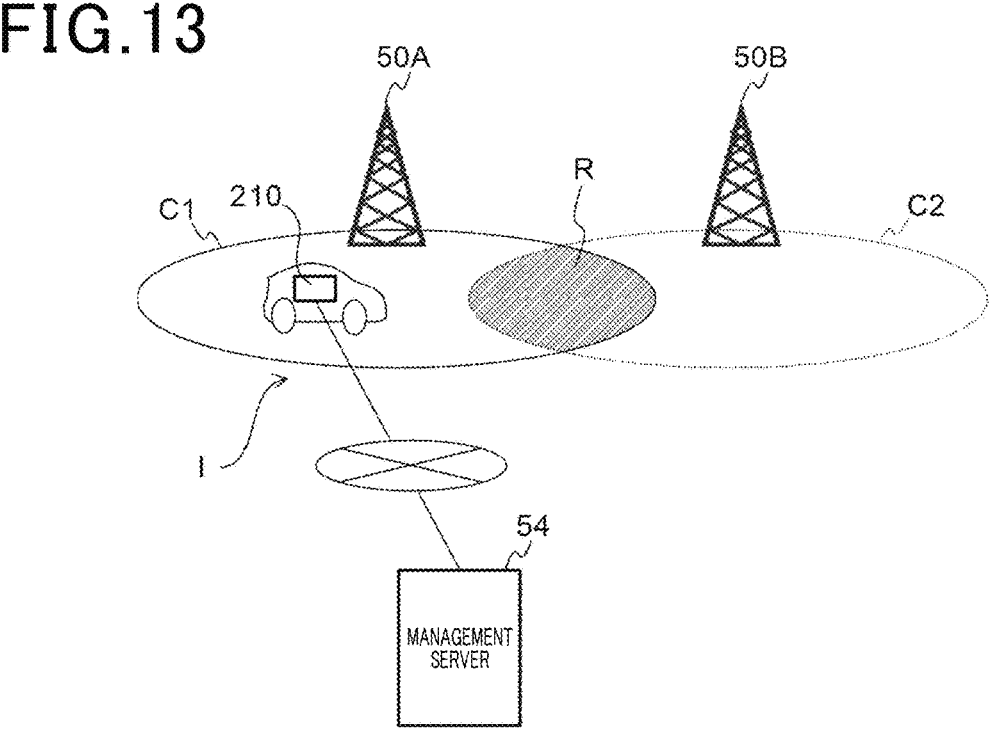
FIG. 13 is an illustration of a process of acquiring quality information from a management server.

In the second embodiment, quality information of another cell is acquired from another mobile station via vehicle-to-vehicle communications. In a modification to the second embodiment, quality information of another cell may be acquired from a management server 54, as indicated by I in FIG. 13. The management server 54 collects, as statistical information, information regarding the communication quality, such as RSRQ and the number of connections, of each cell, and based on the collected information, manages quality information indicating, for each cell, whether communication quality of the cell is high.

Figure 14:
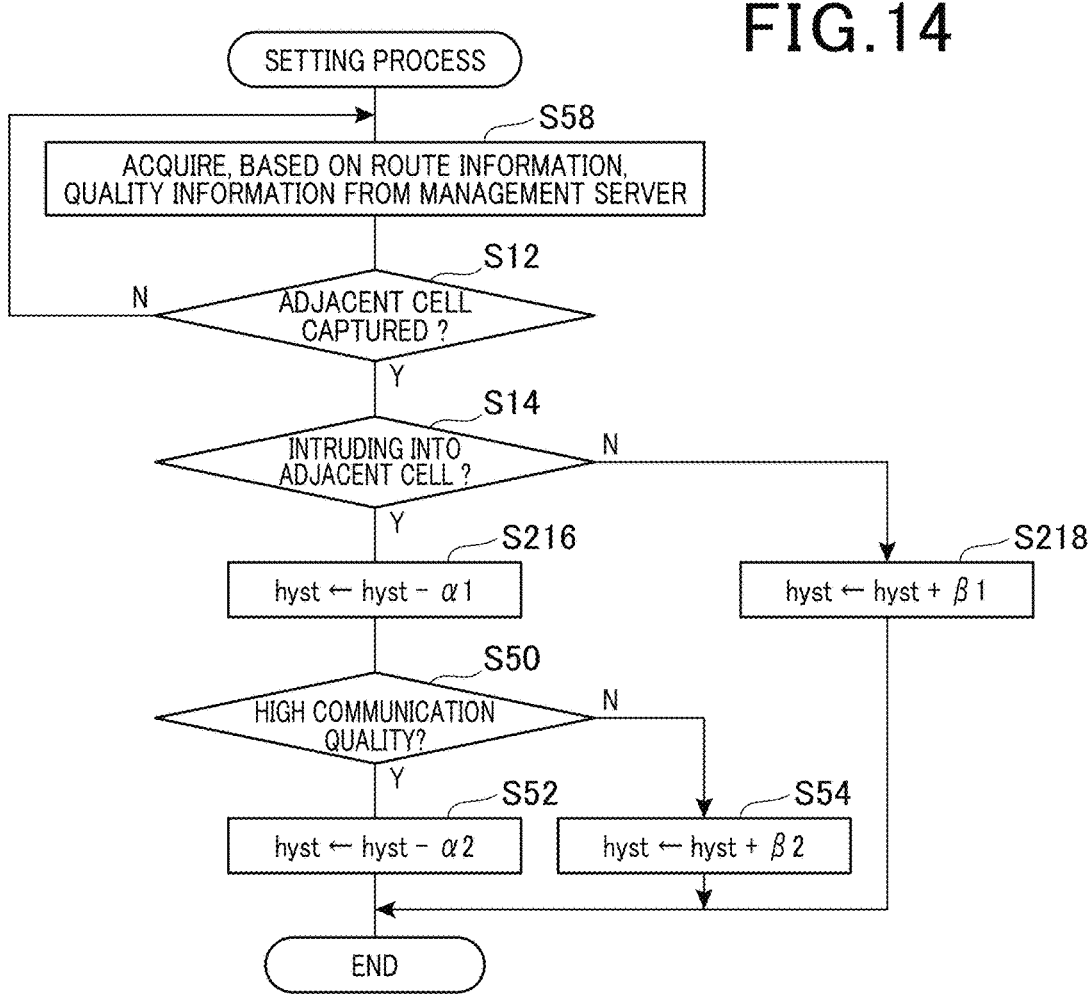
FIG. 14 is a flowchart of a setting process according to a modification to the second embodiment.

The mobile station 210 performs the setting process illustrated in FIG. 14 instead of the setting process illustrated in FIG. 12.

At step S58 in FIG. 14, the acquirer 232 acquires, based on the acquired route information and the area map, quality information related to a cell that the subject mobile station is expected to intrude into, from the management server 54. At step S50, the changer 234 determines, based on the quality information acquired at step S58 from the management server 54, whether the communication quality of the adjacent cell that the mobile station will intrude into is high.

The quality information is acquired from the management server 54 at a timing of step S58. In an alternative embodiment, the quality information may be acquired from the management server 54 at a timing at which it is determined at step S14 that the subject mobile station will intrude into the adjacent cell. In another alternative embodiment, the quality information may be acquired from the management server 54 when making a determination at step S50 as to whether the communication quality is high.

In this modification, quality information of a cell within a range corresponding to the route information is acquired form the management server 54. In an alternative embodiment, quality information of a cell within a predefined range that the subject mobile station is likely to move into may be acquired beforehand from the management server 54 and may be stored in a predefined storage area of the subject mobile station. In such an embodiment, when quality information is used, the quality information may be referenced from the quality information stored in the predefined storage area.

Third Embodiment

A third embodiment will now be described.

Figure 15:
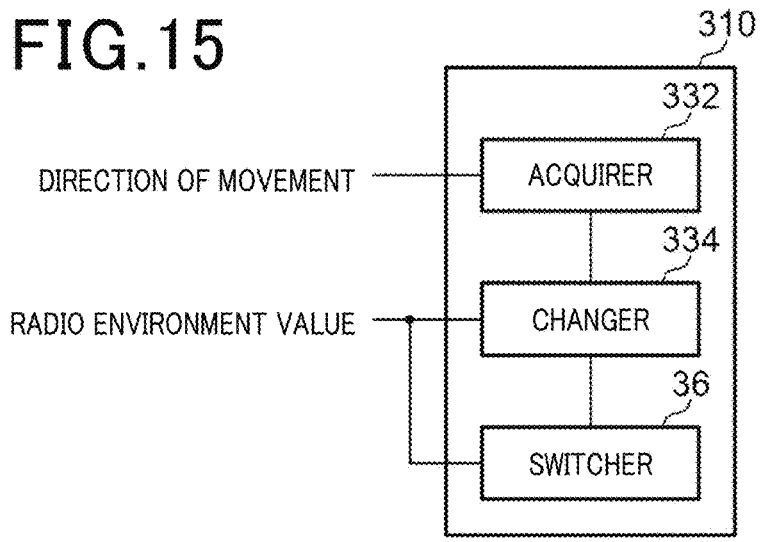
FIG. 15 is a functional block diagram of the mobile station according to a third embodiment.

Functions of the mobile station 310 of the third embodiment will now be described with reference to FIG. 15. As illustrated in FIG. 15, the mobile station 310 includes an acquirer 332, a changer 334, and the switcher 36. Each of the acquirer 332 and the changer 334 may be implemented by the CPU 16 illustrated in FIG. 3.

The acquirer 332 acquires, as a situation of movement of the subject mobile station, a speed of movement of the vehicle equipped with the subject mobile station. For example, the acquirer 332 acquires a speed of movement from outputs of a speed sensor of the vehicle or the like.

The changer 334 changes the criterion for cell switching in response to the speed at which the subject mobile station moves from the serving cell toward the adjacent cell, which is indicated by the speed of movement acquired by the acquirer 332.

More specifically, the changer 334 changes the criterion such that the higher the speed at which the subject mobile station moves from the serving cell toward the adjacent cell, the easier the communication destination is switched from the base station 50A to the base station 50B. The changer 334 changes the criterion such that the lower the speed at which the subject mobile station moves from the serving cell toward the adjacent cell, the harder the communication destination is switched from the base station 50A to the base station 50B. As in the first embodiment, the criterion is changed by changing the hysteresis value to be added to the RSRQ1.

For example, the changer 334 acquires a speed of movement V upon capture of the adjacent cell from the acquirer 332 as the speed at which the subject mobile station moves from the serving cell toward the adjacent cell. If the acquired speed of movement V is greater than a predetermined threshold THV, the changer 334 changes the hysteresis value to a smaller value so as to make the communication destination easier to switch from the base station 50A to the base station 50B. The changer 334 changes the hysteresis value to a larger value so as to make the communication destination harder to switch from the base station 50A to the base station 50B.

Operations of the mobile station 310 of the third embodiment will now be described. During activation of the mobile station 310, the setting process illustrated in FIG. 16 is repeatedly performed.

Figure 16:
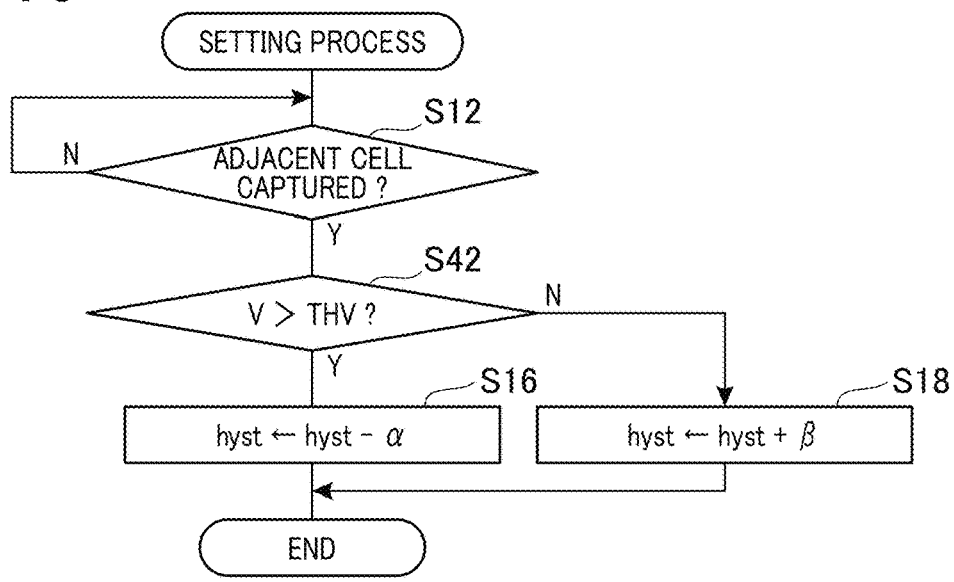
FIG. 16 is a flowchart of a setting process according to the third embodiment.

At step S12 in FIG. 16, if the changer 334 determines that the adjacent cell has been captured, the process flow proceeds to step S42. At step S42, the changer 334 determines whether the speed of movement V acquired by the acquirer 332 is greater than the predetermined threshold THV. If the speed of movement V is greater than the predetermined threshold THV, that is, V>THV, the process flow proceeds to step S16. If the speed of movement V is equal to or less than the predetermined threshold THV, that is, V THV, the process flow proceeds to step S18.

As described above, the mobile station of the third embodiment changes the criterion for cell switching in response to the speed at which the subject mobile station moves from the serving cell toward the adjacent cell. Therefore, the mobile station of the third embodiment shares the advantages of the mobile station of the first embodiment.

In addition, in the third embodiment, if it is determined that the subject mobile station will intrude into the adjacent cell, the criterion may be changed in response to the speed of movement as in the first embodiment.

Fourth Embodiment

A fourth embodiment will now be described.

Figure 17:
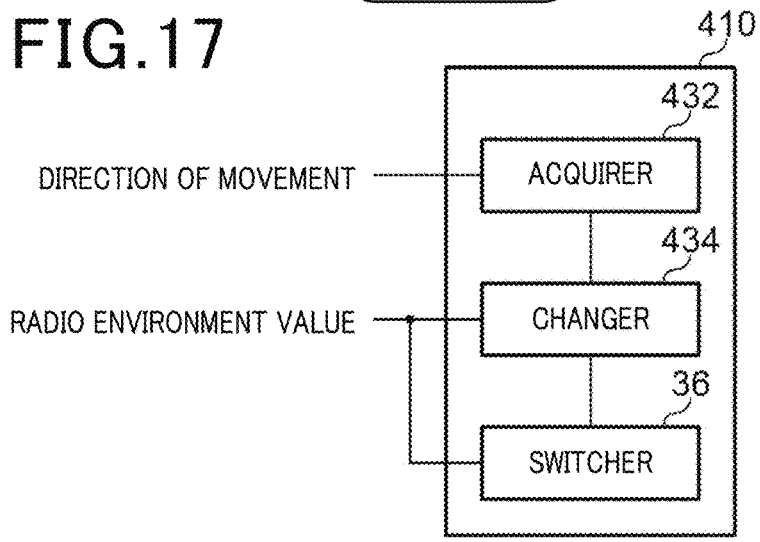
FIG. 17 is a functional block diagram of the mobile station according to a fourth embodiment.

Functions of the mobile station 410 will now be described with reference to FIG. 17. As illustrated in FIG. 17, the mobile station 410 includes an acquirer 432, a changer 434, and the switcher 36. Each of the acquirer 432 and the changer 434 may be implemented by the CPU 16 illustrated in FIG. 3.

The acquirer 432 acquires, as a situation of movement of the subject mobile station, a direction of movement of the subject mobile station. For example, the acquirer 432 acquires the direction of movement from a compass, a global positioning system (GPS) or the like mounted to a vehicle.

The changer 434 changes the criterion for cell switching in response to a comparison of the direction of movement of the subject mobile station acquired by the acquirer 432 and a positional relationship between the serving cell and the adjacent cell. More specifically, the changer 434 changes the criterion such that the higher the degree of match between the direction of movement of the subject mobile station and the direction of the adjacent cell relative to the serving cell, the easier the communication destination is switched from the base station 50A to the base station 50B. The changer 434 changes the criterion such that the lower the degree of match between the direction of movement of the subject mobile station and the direction of the adjacent cell relative to the serving cell, the harder the communication destination is switched from the base station 50A to the base station 50B.

Figure 18:
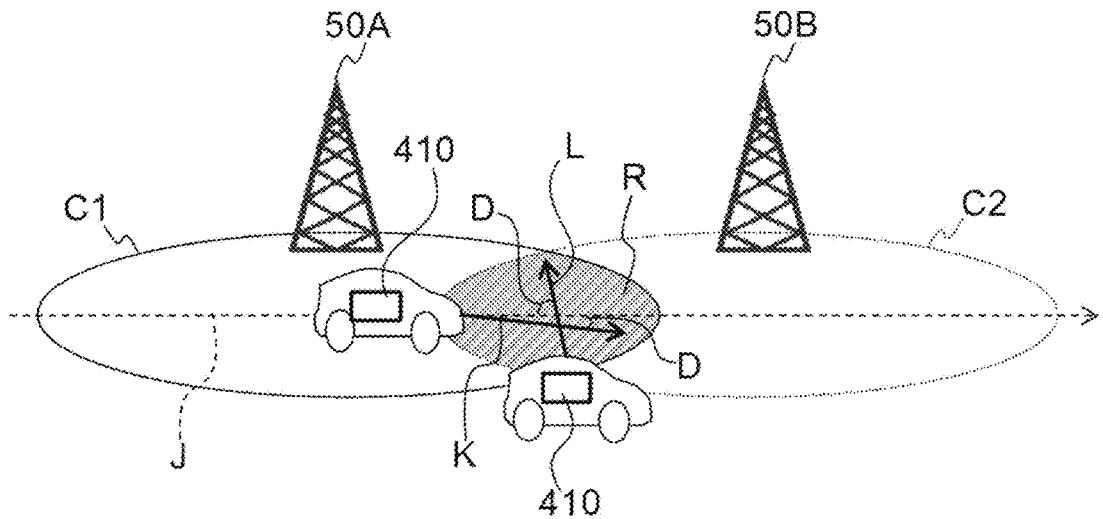
FIG. 18 is an illustration of a cell-to-cell locational direction and a direction of movement of the mobile station.

For example, the changer 434 determines, based on the area map indicating, for each base station, the extent of a cell in which the mobile station can connect to the base station, a locational direction of the cell C2 relative to the cell C1 as indicated by the dashed arrow J in FIG. 18. This locational direction is referred to as a horizontal direction (as viewed from the top of the page). If, upon capture of the adjacent cell, the direction of movement of the subject mobile station is close to the horizontal direction, as indicated by the arrow K in FIG. 18, the mobile station 410 is likely to intrude into the adjacent cell. If, upon capture of the adjacent cell, the direction of movement of the subject mobile station is close to the perpendicular direction, as indicated by the arrow L in FIG. 18, the mobile station 410 is unlikely to intrude into the adjacent cell or likely to stay in the serving cell for some time.

So the changer 434 calculates an inclination D of the direction of movement of the subject mobile station relative to the cell-to-cell locational direction. The inclination D is an angle between the cell-to-cell locational direction and the direction of movement of the mobile station 410, as illustrated in FIG. 18. If the inclination D is less than a threshold THD1, indicating that the direction of movement of the subject mobile station is close to the horizontal direction, the hysteresis value is changed to a smaller value so as to make the communication destination easier to switch from the base station 50A to the base station 50B. If the inclination D is greater than a threshold THD2, indicating that the direction of movement of the subject mobile station is close to the perpendicular direction, the hysteresis value is changed to a larger value so as to make the communication destination harder to switch from the base station 50A to the base station 50B.

Operations of the mobile station 410 of the fourth embodiment will now be described. During activation of the mobile station 410, the setting process illustrated in FIG. 19 is repeatedly performed.

Figure 19:
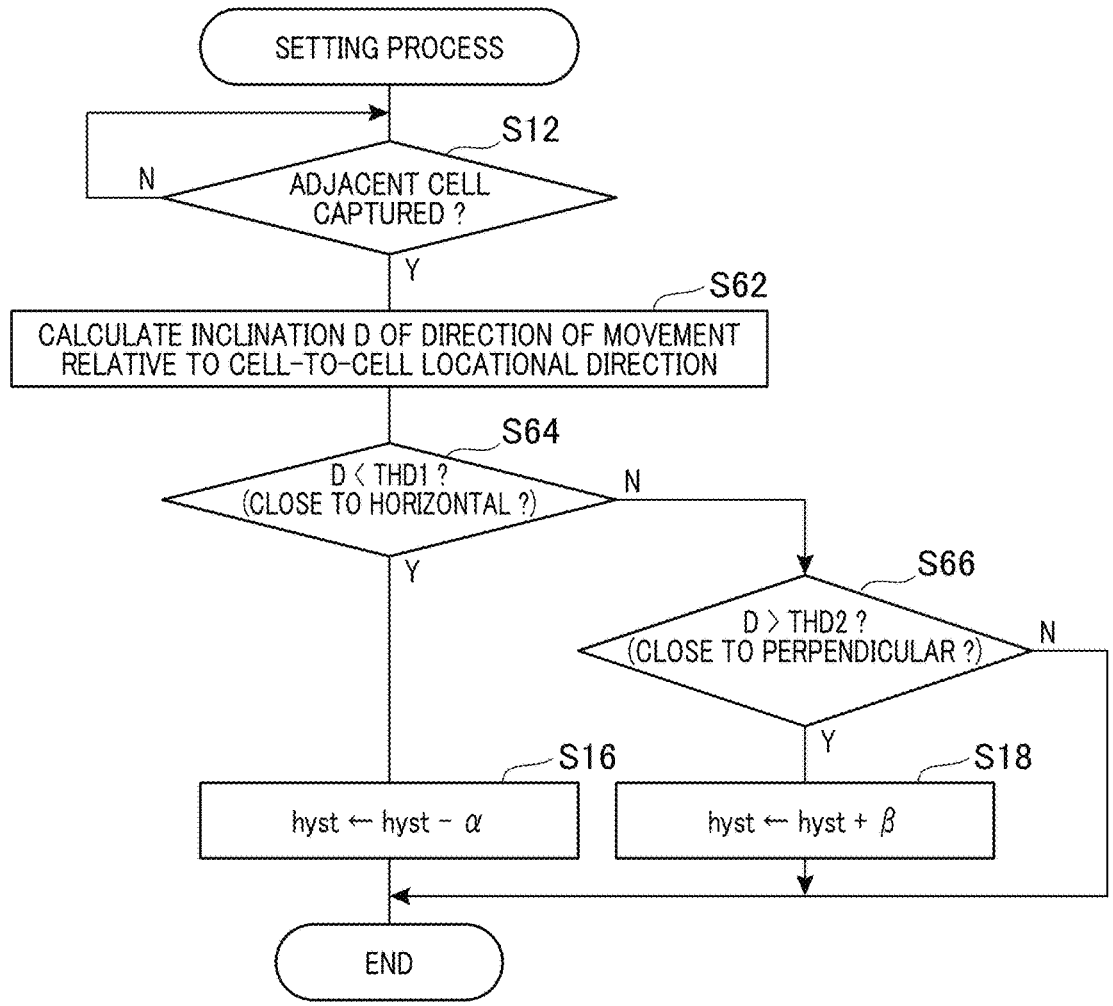
FIG. 19 is a flowchart of a setting process according to the fourth embodiment.

If, at step S12 in FIG. 19, the changer 434 determines that the cell C2 has been captured as an adjacent cell, the process flow proceeds to step S62. At step S62, the changer 434 determines, based on the area map, a locational direction of the cell C2 relative to the cell C1 as the horizontal direction. The changer 434 then calculates the inclination D of the direction of movement of the mobile station 410 relative to the cell-to-cell locational direction.

At step S64, the changer 434 determines whether the inclination D is less than the threshold THD1, thereby determining whether the direction of movement of the mobile station 410 is close to the horizontal direction. If the direction of movement of the mobile station 410 is close to the horizontal direction, the process flow proceeds to step S16. If the direction of movement of the mobile station 410 is not close to the horizontal direction, the process flow proceeds to step S66.

At step S66, the changer 434 determines whether the calculated inclination D is greater than the threshold THD2, thereby determining whether the direction of movement of the mobile station 410 is close to the perpendicular direction. If the direction of movement of the mobile station 410 is close to the perpendicular direction, the process flow proceeds to step S18. If the direction of movement of the mobile station 410 is not close to the perpendicular direction, the process flow ends.

As described above, the mobile station of the fourth embodiment changes the criterion for cell switching in response to a comparison of the direction of movement of the subject mobile station and the locational direction of the adjacent cell relative to the serving cell. Therefore, the mobile station of the fourth embodiment shares the advantages of the mobile station of the first embodiment.

Fifth Embodiment

A fifth embodiment will now be described.

Figure 20:
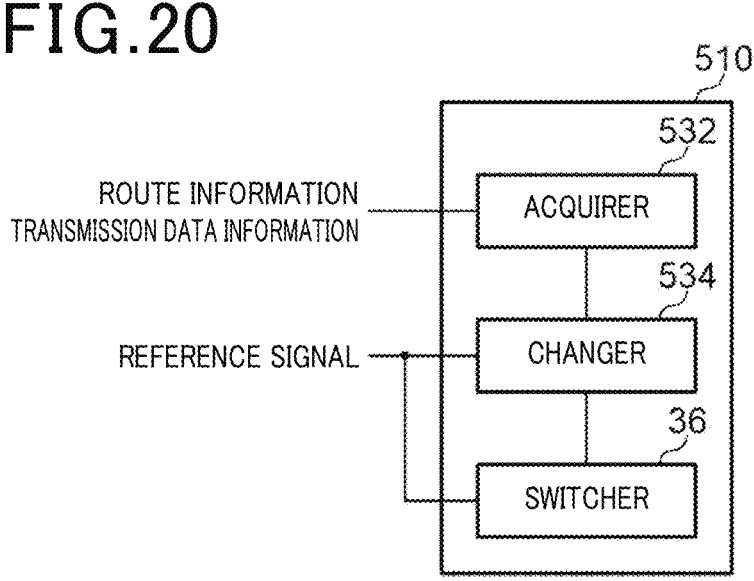
FIG. 20 is a functional block diagram of the mobile station according to a fifth embodiment.

Functions of the mobile station 510 will now be described with reference to FIG. 20. As illustrated in FIG. 20, the mobile station 510 includes an acquirer 532, a changer 534, and the switcher 36. Each of the acquirer 532 and the changer 534 may be implemented by the CPU 16 illustrated in FIG. 3.

Similarly to the acquirer 32 of the first embodiment, the acquirer 532 acquires route information of the subject mobile station. The acquirer 532 further acquires transmission data information related to transmission data generated by applications or the like operating on the mobile station 510 or external devices communicable with the mobile station 510. The transmission data information includes, for example, a data amount of transmission data, whether the transmission data is data having a real-time nature, or the like.

Similarly to the changer 34 of the first embodiment, the changer 534 changes the criterion for cell switching based on the route information. Further, upon the acquirer 532 acquiring the transmission data information, the changer 534 changes the criterion for cell switching in response to at least one of a real-time nature of the transmission data and a data amount of the transmission data. As in the first embodiment, in the present embodiment, the criterion is changed by changing the hysteresis value to be added to the RSRQ1.

More specifically, if a predefined condition is met, the changer 534 determines that the transmission data needs immediacy of data transmission. The predefined condition includes a condition that the transmission data is data having a real-time nature or a condition that a data amount of the transmission data is equal to or greater than a predetermined value. The changer 534 then changes the hysteresis value so as to make the communication destination easier to switch from the base station 50A to the base station 50B. For example, the changer 534 may change the hysteresis value hyst to 0 as soon as the RSRQ2 exceeds the RSRQ1.

Operations of the mobile station 510 of the fifth embodiment will now be described. During activation of the mobile station 510, the setting process illustrated in FIG. 21 is repeatedly performed.

Figure 21:
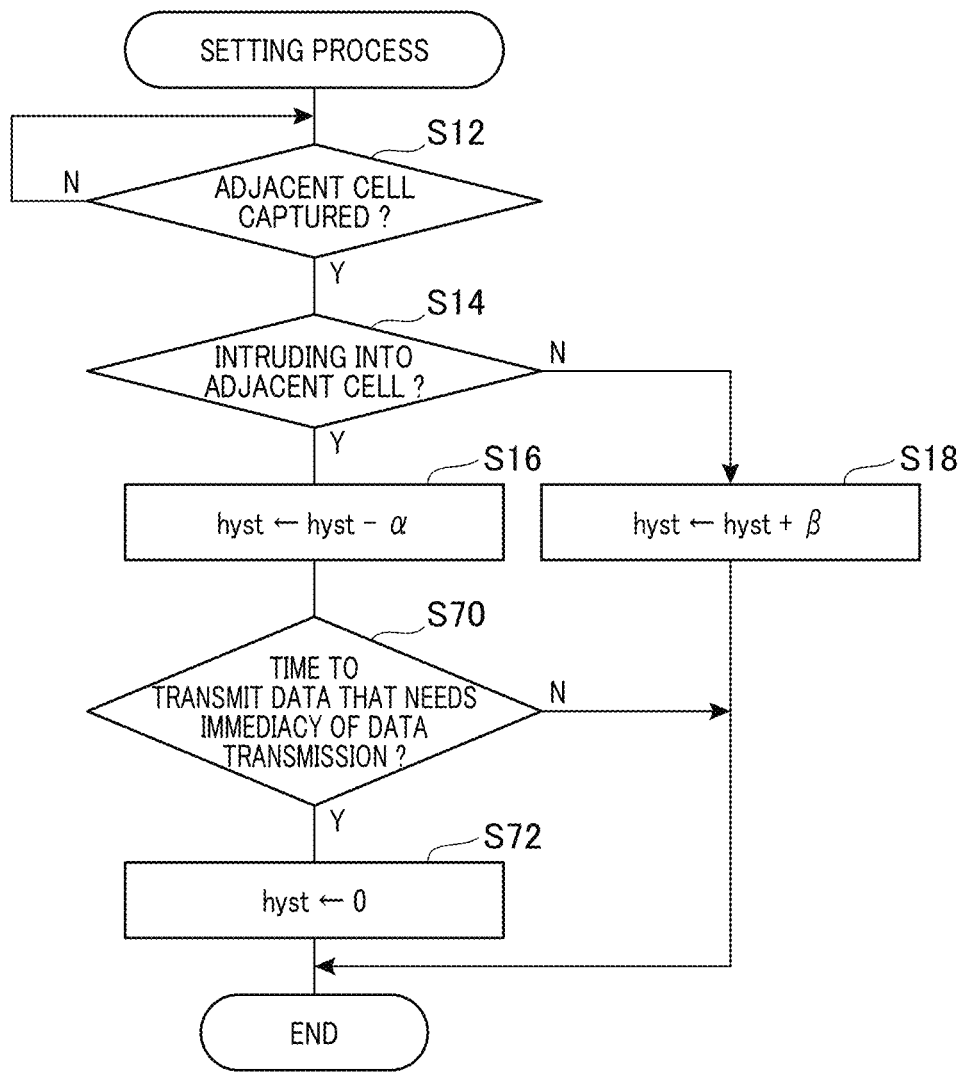
FIG. 21 is a flowchart of a setting process according to the fifth embodiment.

At step S70 subsequent to steps S12 to S16 in FIG. 21, the changer 534 determines, based on the transmission data information acquired by the acquirer 532, whether it is time to transmit data that needs immediacy of data transmission. If it is time to transmit data that needs immediacy of data transmission, the process flow proceeds to step S72, where the changer 534 changes the hysteresis value hyst to 0. Thereafter, the process flow ends.

If it is determined at step S14 that the subject mobile station will not intrude into the adjacent cell and step S18 is completed, the changer 534 does not change the hysteresis value regardless of whether it is time to transmit data that needs immediacy of data transmission.

As described above, the mobile station of the fifth embodiment shares the advantages of the mobile station of the first embodiment. In the timing of transmission of data that needs immediacy of data transmission, the mobile station of the fifth embodiment further changes the criterion to make a switch from the serving cell to the adjacent cell even easier. This enables an earlier switch to a cell of higher communication quality, which can enhance the reliability of transmission of data that needs immediacy of data transmission.

As above, in the setting process illustrated in FIG. 21, the hysteresis value hyst is changed to 0 at step S72. In an alternative embodiment, the hysteresis value hyst may be changed to a relatively small value equal to or greater than 0 at step S72. In another alternative embodiment, as described above, taking into account a processing time for cell switching, the threshold may be set to a negative value.

In the above embodiments, a constant value is used to be added to or subtracted from the hysteresis value. In an alternative embodiment, a variable value may be used to be added to or subtracted from the hysteresis value. For example, in an alternative embodiment to the second embodiment, a plurality of levels of communication quality are predefined. A value to be added to or subtracted from the hysteresis value may a variable value depending on the level of communication quality. In an alternative embodiment to the third embodiment, a value to be added to or subtracted from the hysteresis value may be proportional to the movement speed of the subject mobile station. In an alternative embodiment to the fourth embodiment, a value to be added to or subtracted from the hysteresis value may be proportional to the inclination D of the direction of movement of the subject mobile station relative to the cell-to-cell locational direction.

In the above embodiments, the hysteresis value is changed to a smaller or larger value. In an alternative embodiment, the standard hysteresis value hyst may be preset high. When the subject mobile station will intrude into the adjacent cell, when the communication quality indicated by the quality information is high, when the movement speed is high, or when the direction of movement is close to the horizontal direction, the hysteresis value may be changed to a small value. Otherwise, the setting process may be ended without changing the hysteresis value. In another alternative embodiment, the standard hysteresis value hyst may be preset low. When the subject mobile station will stay in the serving cell, when the communication quality indicated by the quality information is low, when the movement speed is low, or when the direction of movement is close to the perpendicular direction, the hysteresis value may be changed to a large value. Otherwise, the setting process may be ended without changing the hysteresis value.

In a modification to each of the second to fifth embodiments, as in the modification to the first embodiment, the wait time T, the RSRQ1, and the RSRQ2 may be changed instead of the hysteresis value.

In an alternative embodiment, the criterion change may be made by combining two or more of the first to fifth embodiments and their modifications. For example, in a combination of the first embodiment and the third embodiment, when the subject mobile station will intrude into the adjacent cell and the movement speed is low, the hysteresis value may be changed to an even smaller value. In another alternative embodiment, for example, in a combination of the fourth embodiment and the fifth embodiment, when the direction of movement is close to the horizontal direction and it is time to transmit data that needs immediacy of data transmission, the hysteresis value may be changed to an even smaller value.

The combination of the embodiments is not limited to the above combinations. In an alternative embodiment, for example, a final value to be added to or subtracted from the hysteresis value may be a sum, a weighted sum, or an average of values to be added to or subtracted from the hysteresis value in the respective embodiments set forth above.

The above cell-switching control process executed by the CPU executing the software (computer programs) in each of the above-described embodiments may be executed by various processors other than the CPU. Examples of such processors may include a programmable logic device (PLD) whose circuit configuration can be changed after the manufacture of a field-programmable gate array (FPGA) or the like, and a dedicated electric circuit which is a processor having a circuit configuration specifically designed for executing specific processing such as an application specific integrated circuit (ASIC) or the like. In addition, the above cell-switching control process may also be executed by a single processor or by a combination of two or more processors of the same type or of different types (for example, a plurality of FPGAs and combinations of CPUs and FPGAs). Further, specifically, the electric circuit obtained by combining circuit elements, such as semiconductor elements, can be used as the hardware structure of these various processors.

In the above-described embodiments, the aspect in which the cell-switching control programs are pre-stored (pre-installed) in the ROM, but the present disclosure is not limited thereto. The computer programs may be provided in a form recorded on a recording medium, such as a compact disk read only memory (CD-ROM), a digital versatile disk read only memory (DVD-ROM), or a universal serial bus (USB) memory, and then provided. In addition, the computer programs may be downloaded from an external device via the network.

The present disclosure is described in compliance with the embodiments. However, it should be appreciated that the present disclosure is not limited to the embodiments or the structures thereof. The present disclosure encompasses various modified examples and modifications within the range of equivalency. In addition, the scope of the present disclosure and the range of ideas thereof include various combinations and forms and other combinations and forms additionally including one or more elements or a portion of one element.

What is claimed is:

1. A mobile station which communicates with a base station corresponding to a serving cell, the serving cell being a cell in which the mobile station is located, of a plurality of cells, the mobile station comprising:
   an acquirer configured to acquire a situation of movement of the mobile station;
   a changer configured to change a criterion used to determine whether to switch a communication destination from a first base station corresponding to the serving cell to a second base station corresponding to an adjacent cell neighboring the serving cell, in response to the situation of movement of the mobile station acquired by the acquirer and a positional relationship between the serving cell and the adjacent cell, wherein
   the acquirer is configured to acquire, as the situation of movement of the mobile station, route information indicating a travel plan of the mobile station, and
   the changer is configured to, based on the route information acquired by the acquirer, change the criterion in response to whether the mobile station will move out of the serving cell and intrude into the adjacent cell.

2. The mobile station according to claim 1, wherein
   the changer is configured to, in response to the route information acquired by the acquirer indicating that the mobile station will move out of the serving cell and intrude into the adjacent cell, change the criterion so as to make the communication destination easier to switch from the first base station to the second base station as compared to when a predefined standard criterion is used as the criterion.

3. The mobile station according to claim 1, wherein
   the changer is configured to, in response to the route information acquired by the acquirer indicating that the mobile station will stay in the serving cell, change the criterion so as to make the communication destination harder to switch from the first base station to the second base station as compared to when a predefined standard criterion is used as the criterion.

4. The mobile station according to claim 1, wherein
   the acquirer is configured to acquire, as the situation of movement of the mobile station, a speed of movement of the mobile station, and
   the changer is configured to change the criterion in response to a speed at which the mobile station moves from the serving cell to the adjacent cell, which speed is indicated by the speed of movement acquired by the acquirer.

5. The mobile station according to claim 4, wherein
   the changer is configured to at least either:
   change the criterion such that the higher the speed at which the mobile station moves from the serving cell toward the adjacent cell, the easier the communication destination is switched from the first base station to the second base station; or
   change the criterion such that the lower the speed at which the mobile station moves from the serving cell toward the adjacent cell, the harder the communication destination is switched from the first base station to the second base station.

6. The mobile station according to claim 1, wherein
   the acquirer is configured to acquire, as the situation of movement of the mobile station, a direction of movement of the mobile station, and
   the changer is configured to change the criterion in response to a comparison between the direction of movement acquired by the acquirer and a positional relationship between the serving cell and the adjacent cell.

7. The mobile station according to claim 6, wherein
   the changer is configured to at least either:
   change the criterion such that the higher the degree of match between the direction of movement acquired by the acquirer and a direction of the adjacent cell relative to the serving cell, the easier the communication destination is switched from the first base station to the second baes station; or
   change the criterion such that the lower the degree of match between the direction of movement acquired by the acquirer and the direction of the adjacent cell relative to the serving cell, the harder the communication destination is switched from the first base station to the second base station.

8. The mobile station according to claim 1, wherein
   the acquirer is configured to acquire information indicating a communication quality of the adjacent cell, and
   the changer is configured to at least either:
   change the criterion such that the higher the communication quality of the adjacent cell acquired by the acquirer, the easier the communication destination is switched from the first base station to the second base station; or
   change the criterion such that the lower the communication quality of the adjacent cell acquired by the acquirer, the harder the communication destination is switched from the first base station to the second base station.

9. The mobile station according to claim 8, wherein
   the acquirer is configured to acquire the information indicating the communication quality of the adjacent cell from communications with other mobile stations and statistical information pre-stored in the mobile station or a server.

10. The mobile station according to claim 1, wherein
    the changer is configured to, at a timing of transmission of data from the mobile station, change the criterion in response to at least one of a real-time nature of the data and an amount of the data.

11. The mobile station according to claim 1, wherein
the criterion is used to, in response to a state where a radio environment value of the adjacent cell is above a threshold given by a radio environment value of the serving cell plus a hysteresis value continuing for a predetermined wait time or longer, determine to switch the communication destination from the first base station to the second base station, and the changer is configured to change the criterion by increasing or decreasing at least one of the radio environment value of the serving cell, the hysteresis value, the predetermined wait time, and the radio environment value of the adjacent cell.

12. The mobile station according to claim 1, further comprising a switcher configured to, in response to a radio environment value for each of the serving cell and the adjacent cell meeting the criterion changed by the changer, switch the communication destination from the first base station to the second base station.

13. A cell-switching control method for a mobile station which communicates with a base station corresponding to a serving cell, the serving cell being a cell in which the mobile station is located, of a plurality of cells, the method comprising:

acquiring a situation of movement of the mobile station;

changing a criterion used to determine whether to switch a communication destination from a first base station corresponding to the serving cell to a second base station corresponding to an adjacent cell neighboring the serving cell, in response to the acquired situation of movement of the mobile station and a positional relationship between the serving cell and the adjacent cell, wherein the acquiring includes acquiring, as the situation of movement of the mobile station, route information indicating a travel plan of the mobile station, and the changing includes changing the criterion in response to whether the mobile station will move out of the serving cell and intrude into the adjacent cell, based on the acquired route information.

14. A tangible, non-transitory, computer-readable storage medium having computer-executable instructions for enabling a mobile station which communicates with a base station corresponding to a serving cell, the serving cell being a cell in which the mobile station is located, of a plurality of cells, the instructions causing a computer to:

acquire a situation of movement of the mobile station;

change a criterion used to determine whether to switch a communication destination from a first base station corresponding to the serving cell to a second base station corresponding to an adjacent cell neighboring the serving cell, in response to the acquired situation of movement of the mobile station and a positional relationship between the serving cell and the adjacent cell, wherein the instructions include instructions causing the computer to acquire, as the situation of movement of the mobile station, route information indicating a travel plan of the mobile station, and change the criterion in response to whether the mobile station will move out of the serving cell and intrude into the adjacent cell, based on the acquired route information.

15. A mobile station which communicates with a base station corresponding to a serving cell, the serving cell being a cell in which the mobile station is located, of a plurality of cells, the mobile station comprising:

an acquirer configured to acquire a situation of movement of the mobile station;

a changer configured to change a criterion used to determine whether to switch a communication destination from a first base station corresponding to the serving cell to a second base station corresponding to an adjacent cell neighboring the serving cell, in response to the situation of movement of the mobile station acquired by the acquirer and a positional relationship between the serving cell and the adjacent cell, wherein the criterion is used to, in response to a state where a radio environment value of the adjacent cell is above a threshold given by a radio environment value of the serving cell plus a hysteresis value continuing for a predetermined wait time or longer, determine to switch the communication destination from the first base station to the second base station, and the changer is configured to change the criterion by increasing or decreasing at least one of the radio environment value of the serving cell, the hysteresis value, the predetermined wait time, and the radio environment value of the adjacent cell.

\* \* \* \* \*